US008646844B2

(12) United States Patent
Blind et al.

(10) Patent No.: US 8,646,844 B2
(45) Date of Patent: Feb. 11, 2014

(54) SEAT WIDTH ADJUSTMENT MECHANISM

(75) Inventors: Alain Blind, Bad Duerkheim (DE); Alexander Dantmann, Sandhausen (DE); Jeremias Rehn, Altdorf (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/529,362

(22) Filed: Jun. 21, 2012

(65) Prior Publication Data
US 2012/0326478 A1 Dec. 27, 2012

(51) Int. Cl.
*A47C 1/12* (2006.01)
*A47C 3/00* (2006.01)

(52) U.S. Cl.
USPC .................................. 297/452.4; 297/284.2

(58) Field of Classification Search
USPC .................. 297/452.4, 284.2, 284.1
See application file for complete search history.

(56) References Cited

U.S. PATENT DOCUMENTS

| 4,462,635 A * | 7/1984 | Lance | 297/284.3 |
| 4,636,000 A * | 1/1987 | Nishino | 297/284.9 |
| 4,712,834 A | 12/1987 | Warrick | |
| 5,098,157 A * | 3/1992 | Surot | 297/250.1 |
| 6,672,666 B2 * | 1/2004 | Stiller et al. | 297/284.2 |
| 2006/0055225 A1 | 3/2006 | Yasuda et al. | |
| 2012/0286552 A1 * | 11/2012 | Kace et al. | 297/284.2 |

FOREIGN PATENT DOCUMENTS

| DE | 1959505 | 6/1970 |
| DE | 4339114 A1 | 5/1995 |
| DE | 19920216 | 11/2000 |
| DE | 20100018 | 3/2002 |
| DE | 10057449 | 5/2002 |
| DE | 102006020671 | 11/2007 |
| DE | 102009040884 | 3/2011 |
| FR | 2587201 | 3/1987 |

OTHER PUBLICATIONS

DE Search Report received Apr. 23, 2012 (5 pages).
European Search Report, dated Sep. 13, 2012 (6 pages).

\* cited by examiner

*Primary Examiner* — Milton Nelson, Jr.

(57) ABSTRACT

A seat width adjustment mechanism includes a first adjustment element and a second adjustment element, and an actuator for adjusting the distance between the two adjustment elements. A guiding element is connected to each of the adjustment elements. A piece of material extends over and between the two adjustment elements and is held under tension so that the guiding elements slide under the material to change the amount of seat forming material by changing the distance between the two adjustment elements.

10 Claims, 2 Drawing Sheets

SEAT WIDTH ADJUSTMENT MECHANISM

FIELD OF THE INVENTION

The present disclosure relates to a mechanism for adjusting the width of a motor vehicle seat.

BACKGROUND OF THE INVENTION

DE 10 2006 020 671 A1 shows a motor vehicle driver's seat which can be adjusted in width. The seat has two seat halves, and the distance between the halves can be changed by means of a spindle drive. An elastic intermediate element bridges a gap between the two seat halves, which becomes larger with increasing distance. The different resilience of the flexible intermediate element on the one hand, and the adjacent seat halves on the other hand, can lead to an inhomogeneous load behavior of the seat area and an undesired worsening of the seat comfort.

SUMMARY

According to an aspect of the present disclosure, a seat adjustment device improves seat comfort. A vehicle seat width adjustment device includes a first adjustment element and a second adjustment element, wherein a distance between the two adjustment elements can be changed by means of an actuator device. A guiding element is connected to each of the adjustment elements. A piece of material extends between and over the guiding element and is held under tension so that the guiding elements slide with respect to the material, and so that the amount of material which forms a seat surface can be adapted by changing the distance between the two guiding elements. The material forms the entire seat surface so that a possible impairment of seat comfort because of an inhomogeneous load behavior of the seat surface is avoided.

The material is preferably a textile fabric. The textile fabric can be given a desired load behavior with a corresponding specification of the fiber orientation and the fiber characteristics. The textile fabric is designed as a breathable functional fabric.

A seat and/or backrest padding made of a spacer fabric can be placed on the textile fabric. The seat and/or backrest padding can be affixed on the seat surface formed by the material, in a removable manner with Velcro fasteners. The spacer fabric is a three-dimensional textile fabric, in which two opposite textile outer surfaces are kept at a distance by spacer connecting threads. The characteristic structure of the spacer fabric leads not only to an improved moisture removal and air permeability of a thus equipped seat and/or backrest padding, but also to a defined elastic behavior in the longitudinal and transverse direction.

Moreover, the inelastic material may be held under tension by several tension springs. The tension springs are connected to a base frame of the vehicle seat. By replacing the tension springs, it is also possible to subsequently adapt the resilience of the seat surface to various driver weights and sitting habits.

The two adjustment elements are pivotally mounted on a base frame of the motor vehicle seat. The pivotal mounting provides a compact and robust structure for the actuator device. In addition to or as an alternative to, the adjustment elements to change the distance relative to one another can be arranged so that they can be displaced longitudinally. In this case, a height change of the seat surface, which would inevitably appear when the adjustment elements are swiveled, can be avoided, or at least reduced.

The adjustment elements are L-shaped members, wherein, a first leg is attached to the guiding element, and a second leg is pivotally coupled to a base frame of the motor vehicle seat. The pivoting of the adjustment element is controlled by the actuator device, wherein the lever ratios resulting from the L-shaped design of the legs favor a pivoting of the adjustment element.

To control the pivoting, the actuator device can comprise an actuation transmitter, which works with a spindle drive which is actuatable manually and/or with an electric motor. The actuation transmitter has a threaded bush, which is supported transverse to the adjustment direction so it can swivel, into which meshes a threaded spindle drive. In turn, the threaded spindle is connected with a hand crank and/or an electric motor for the adjustment of the seat width.

In order to make possible an opposite pivoting of the two legs, the actuator device can have its own actuation transmitter for each of the two legs. In this case, the spindle drive comprises two threaded spindle sections, designed in opposite directions.

The guiding element is a sliding rod, oriented transverse to the adjustment direction. To increase the twisting rigidity, it is conceivable that for each of the two adjustment elements, an arrangement of the legs in pairs is provided, wherein the sliding bar connects the two legs in the form of a bridge in the area of the first leg end with one another. Moreover, a swivel rod, connecting the two legs in the area of the second leg end can be provided, which is supported on a base frame of the motor vehicle sea in such a way that it forms a swivel leg to swivel the adjustment element.

In order to impart an ergonomic surface course to the seat surface formed by the material, the sliding rod may be bent outwardly. This produces a seat hollow-type formation of the seat surface, formed by the material.

DETAILED DESCRIPTION OF THE DRAWINGS

Figure 1:
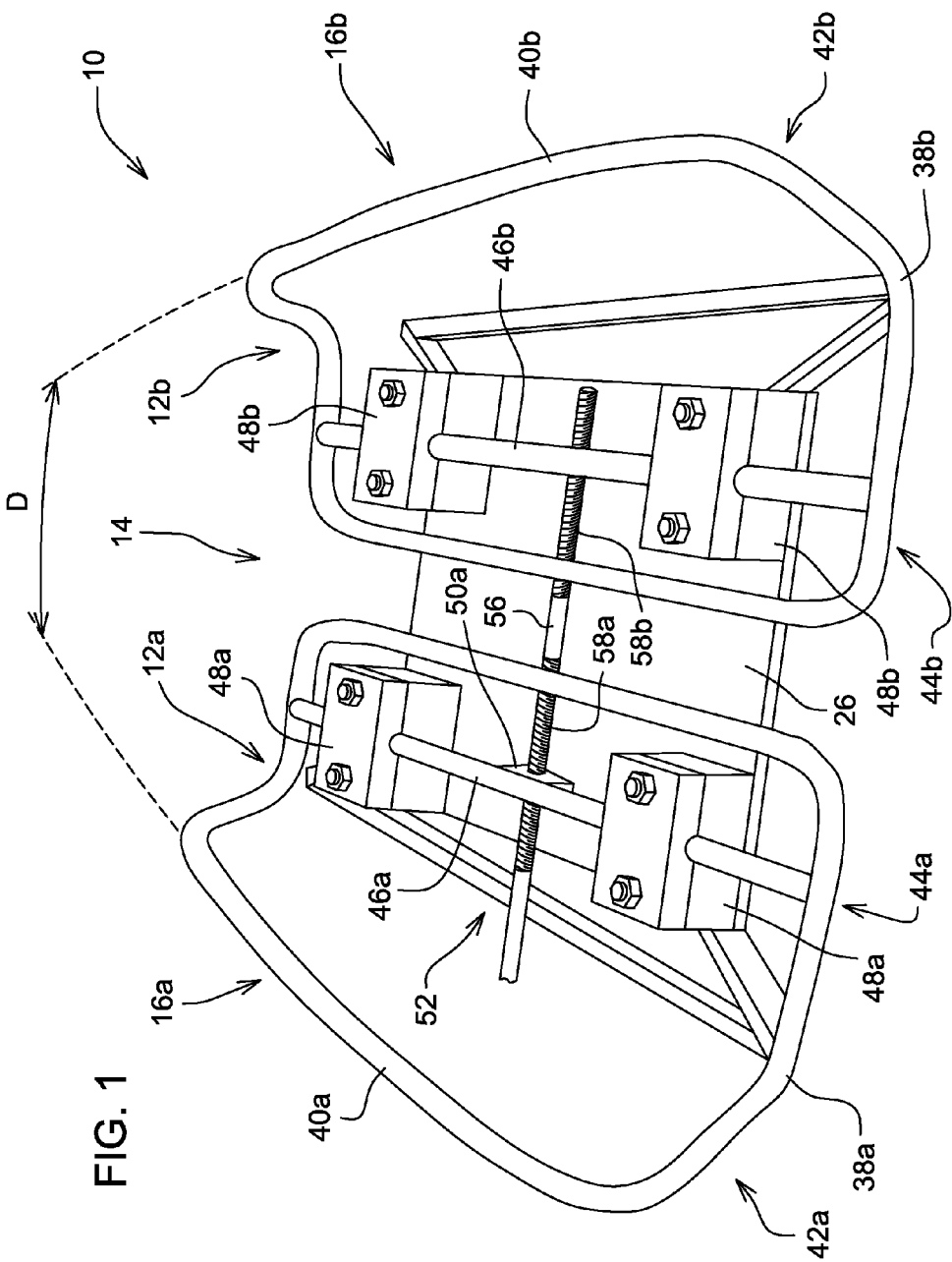
FIG. 1 is a perspective view of a seat width adjustment mechanism according to the invention.
Figure 2:
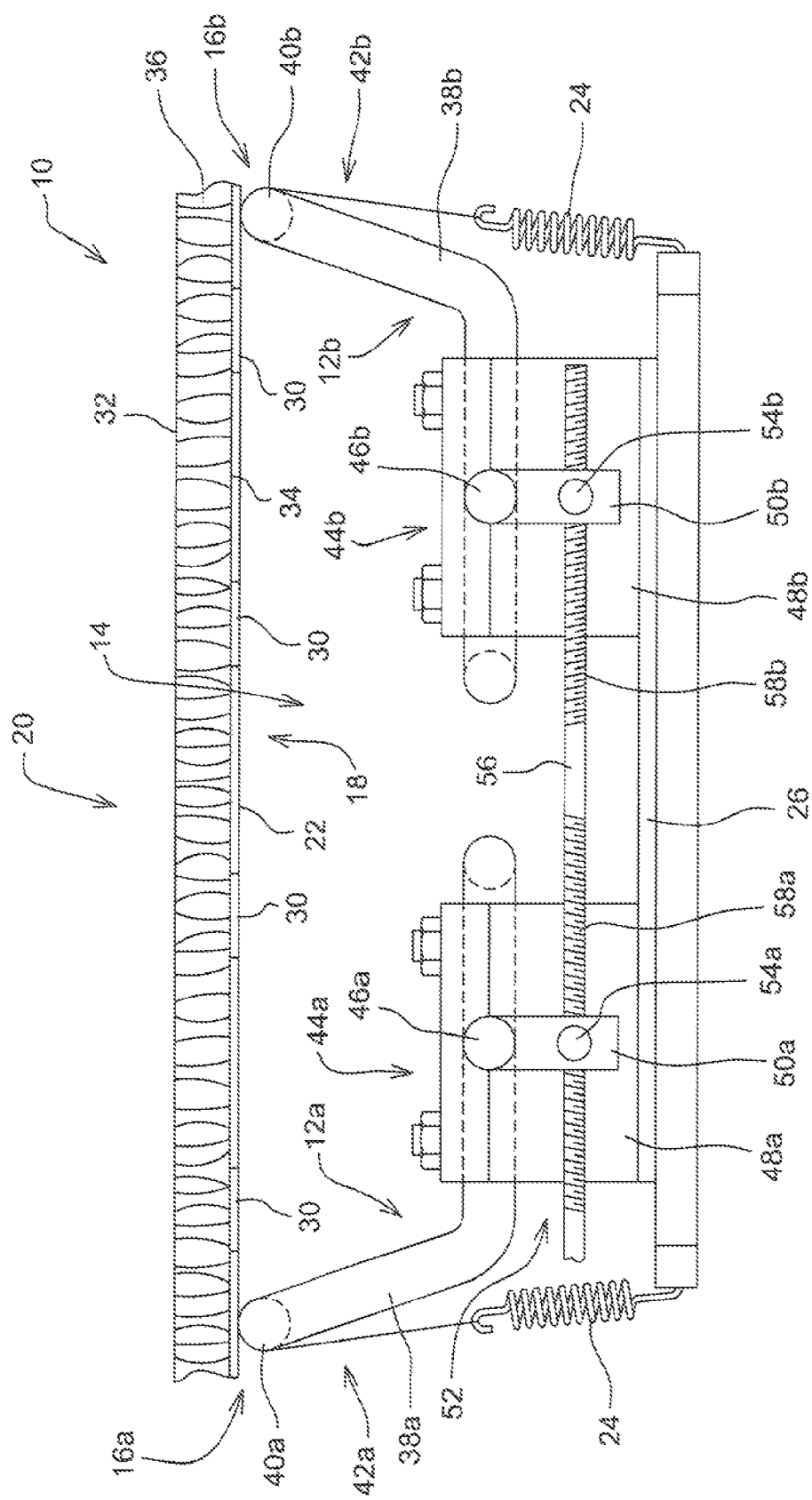
FIG. 2 is an end view of the seat width adjustment mechanism of FIG. 1.

A seat width adjustment mechanism 10 includes a first adjustment element 12a and a second adjustment element 12b. A distance D between the two adjustment elements 12a and 12b can be changed with an actuator device 14. Each adjustment element 12a and 12b includes a guiding element 16a, 16b. A piece of material 18 extends or runs between the two adjustment elements 12a, 12b. Material 18 is clamped and slides along the guiding element 16a and 16b so that a portion of the material 18 which forms a seat surface 20, can be adapted by changing the distance D between the two adjustment elements 12a and 12b. The material 18 is omitted for reasons of clarity in FIG. 1, so that reference is made in this connection, to FIG. 2.

The material 18 is a textile fabric 22, in particular, a breathable functional fabric. The textile fabric 22 is preferably inelastic and is held under tension by several tension springs 24. The tension springs 24 are connected with a base frame 26 of the motor vehicle seat. A seat and/or backrest padding, made of a spacer fabric 28, is affixed on a portion of the textile fabric 22, forming the seat surface 22, in a removable manner, with several Velcro fasteners (not shown). The spacer fabric 28 is a three-dimensional textile fabric, in which two opposite textile outside surfaces 32 and 34 are kept at a distance by spacer connecting threads 36. The spacer fabric 28 is surrounded protectively by a padding cover (not shown).

The two adjustment elements 12a and 12b are pivotally mounted so that the distance D can be changed. To increase the twisting rigidity, each of the two adjustment elements 12a, 12b includes a pair of L-shaped legs 38a, 38b. The guiding elements 16a, 16b are rods 40a, 40b which are oriented transverse to the distance D. The rods 40a, 40b are curved and are convex outwardly in a direction facing away from each other.

Each rod 40a, 40b interconnects and forms a bridge between each pair of legs 38a, 38b at leg ends 42a, 42b. Each pair of legs 38a, 38b is connected to a corresponding swivel rod 46a, 46b, near the two leg ends 44a, 44b. Each swivel rod 46a, 46b is supported on the base frame 26 of the motor vehicle seat by a corresponding pair of holders 48a and 48b, so that the adjustment elements 12a and 12b can be pivoted by the actuator device 14.

Each swivel rod 46a, 46b is mounted to a corresponding actuation transmitter 50a, 50b. The transmitters 50a, 50b interacts with a spindle drive 52 which is rotated manually and/or with an electric motor (not shown). Each actuation transmitter 50, 50b has a threaded bush 54a, 54b, which is supported transverse to the adjustment direction so that it can pivot. The threaded bush 54a, 54b receives a threaded spindle 56 which is part of the spindle drive 52. The threaded spindle 56 is in turn, connected with a hand crank and/or an electric motor (not shown) for the seat width adjustment.

In order to pivot the legs 38a and 38 in opposite directions, the spindle 56 includes two threaded sections 58a and 58b which are threaded in opposite directions, so that depending on the rotation direction of the spindle 56, the distance between the two actuation transmitters 50a, 50b and, thus, the distance D between the two adjustment elements 12a, 12b increases or decreases.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A seat width adjustment mechanism comprising:
   a first adjustment element;
   a second adjustment element;
   an actuator device for adjusting a distance (D) between the first and second adjustment elements;
   a pair of guiding elements, each guiding element being attached to a corresponding one of the adjustment elements; and
   a piece of material runs between the guiding elements, the piece of material sliding over the pair of guiding elements so that a portion of the piece of material, which forms a seat surface can be adapted by changing the distance (D), and the piece of material is inelastic and is tensioned by several tension springs.

2. The seat width adjustment mechanism of claim 1, wherein:
   the two adjustment elements are pivotally mounted.

3. The seat width adjustment mechanism of claim 1, wherein:
   each adjustment element comprises a pair of L-shaped legs, each leg having a first end connected to the guiding element; and
   each leg having a second end pivotally supported on a base frame of a motor vehicle.

4. The seat width adjustment mechanism of claim 1, wherein:
   the actuator device comprises a pair of actuation transmitters, each actuation transmitter being coupled to a rotatable spindle drive.

5. The seat width adjustment mechanism of claim 1, wherein:
   the piece of material is a textile fabric which is under suspension.

6. The seat width adjustment mechanism of claim 5, wherein:
   a padding, made of a spacer fabric is placed on the textile fabric.

7. The seat width adjustment mechanism of claim 1, wherein:
   each guiding element comprises a rod which is oriented transverse to the distance (D).

8. The seat width adjustment mechanism of claim 7, wherein:
   the rods are curved and are convex in a direction facing away from each other.

9. A seat width adjustment mechanism comprising:
   a first adjustment element;
   a second adjustment element;
   an actuator device for adjusting a distance (D) between the first and second adjustment elements;
   a pair of guiding elements, each guiding element being attached to a corresponding one of the adjustment elements, each adjustment element comprises a pair of L-shaped legs, each leg having a first end connected to the guiding element, and each leg having a second end pivotally supported on a base frame of a motor vehicle; and
   a piece of material runs between the guiding elements, the piece of material sliding over the pair of guiding elements so that a portion of the piece of material, which forms a seat surface can be adapted by changing the distance (D).

10. The seat width adjustment mechanism of claim 9, wherein:
    the actuator device includes a pair of actuation transmitters, each actuation transmitter being coupled to one of the legs.

* * * * *